Patented Aug. 15, 1950

2,518,662

UNITED STATES PATENT OFFICE 2,518,662

PREPARATION OF β-LACTONES IN THE PRESENCE OF DIFLUOROPHOSPHATE CATALYSTS

John R. Caldwell, Kingsport, Tenn., assignor to Eastman Kodak Company, Rochester, N. Y., a corporation of New Jersey No Drawing. Application October 27, 1948, Serial No. 56,902

11 Claims. (Cl. 260—344)

This invention relates to a process for preparing lactones of β-hydroxy carboxylic acids. More specifically, this invention relates to a process for preparing lactones of β-hydroxy carboxylic acids which comprises reacting a ketene with a carbonyl-containing compound such as an aldehyde, ketone, diketone, or ketoester.

Staudinger first showed that a keto ketene, such as diphenyl ketene, added to aldehydes or ketones to give β-lactones. Ann. 384, 38–135 (1911) and Ann. 380, 243 (1911). Staudinger also showed the addition of diphenyl ketene to unsaturated ketones, and isolated diolefins from the reaction mixture. Ann. 401, 263 (1913).

Aldo ketenes, on the other hand, are relatively unstable as compared with keto ketenes and dimerize rapidly, under ordinary conditions of temperature and pressure. In the absence of a catalyst, aldo ketenes do not condense with carbonyl compounds, but form the dimer instead. With aldehydes, the ketene dimers react to form unsaturated ketones. See Boese, United States Patent 2,108,427, dated February 15, 1938.

Kung in United States Patent 2,356,459, dated August 22, 1944, has shown that ketene ($CH_2=C=O$) reacts with aldehydes or ketones to give β-lactones, in the presence of Friedel-Crafts type of catalysts.

I have now found that β-lactones can be prepared by reacting a ketene with an aldehyde, ketone, diketone, or ketoester, hereinafter referred to as carbonyl-containing compounds, in the presence of certain metal salts of difluorophosphoric acid as catalysts. The metal salts of difluorophosphoric acid which I employ as catalysts cannot be classified as Friedel-Crafts type catalysts, as can the catalysts heretofore employed in the prior art, as exemplified by the Kung patent referred to above. The catalysts of my invention are further distinguished from those heretofore employed in that they permit the utilization of a greater number and variety of carbonyl-containing compounds than has been previously possible.

It is, therefore, an object of this invention to provide a process for preparing β-lactones. A further object is to provide a process wherein undesirable carbonylic condensation and catalyst complexes are largely or entirely avoided. A still further object is to provide a process which permits separation of a purer product without difficulty. Another object is to provide new catalysts for the condensation of a ketene and a carbonyl-containing compound. Other objects will become apparent from a consideration of the following examples and description.

The ketenes which are advantageously employed in practicing my invention can be represented by the following general formula:

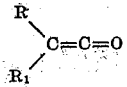

wherein R and $R_1$ each represents a hydrogen atom, an alkyl group (i. e. especially methyl and ethyl groups, i. e. alkyl groups of the formula $C_nH_{2n+1}$ wherein $n$ represents a positive integer of from 1 to 2) or an aryl group (especially a phenyl group, i. e. a $C_6H_5$-group). Although my invention is directed primarily to a process involving ketene ($CH_2=C=O$), any aldo ketene or any keto ketene can be employed. Typical aldo ketenes include ketene, methyl ketene, ethyl ketene, etc. Typical keto ketenes include dimethyl ketene, diethyl ketene, diphenyl ketene, methyl phenyl ketene, etc.

The aldehydes which are advantageously employed in practicing my invention can be represented by the following general formula:

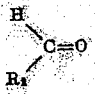

wherein $R_2$ represents hydrogen, an alkyl group (especially methyl, ethyl, isopropyl, n-propyl, n-butyl, isobutyl, secondary butyl and tertiary butyl groups, i. e. an alkyl group of the formula $C_nH_{2n+1}$ wherein $n$ represents a positive integer of from 1 to 4), an aralkyl group (especially benzyl or β-phenylethyl), and an aryl group (especially a monocyclic aryl group of the benzene series, e. g. phenyl, m-tolyl and p-tolyl). My new process is especially useful for the preparation of β-lactones from aldehydes of the above general formula wherein $R_2$ represents a hydrogen atom or a methyl group.

The ketones which are advantageously employed in practicing my invention can be represented by the following general formula:

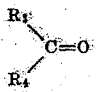

wherein $R_3$ represents an alkyl group (especially methyl, ethyl, isopropyl, n-propyl, n-butyl, isobutyl, secondary butyl and tertiary butyl groups, i. e. an alkyl group of the formula $C_nH_{2n+1}$ wherein $n$ represents a positive integer of from 1 to 4), an aryl group (especially a monocyclic aryl group of the benzene series, e. g. phenyl, m-tolyl and p-tolyl), or an aralkyl group (especially benzyl and β-phenylethyl), and R4 represents an alkyl group (especially methyl and ethyl groups), an aryl group (especially a monocyclic aryl group of the benzene series, e. g. phenyl, m-tolyl and p-tolyl) or an aralkyl group (especially benzyl and β-phenylethyl). My new process is especially useful for the preparation of β-lactones from the above-formulated ketones wherein R4 represents a methyl group.

The diketones which are advantageously employed in practicing my invention can be represented by the following general formula:

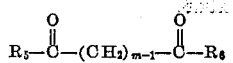

wherein R5 and R6 each represents an alkyl group (especially a methyl, an ethyl or a n-propyl group) and $m$ represents a positive integer of from 1 to 3.

The keto carboxylic esters which are advantageously employed in practicing my invention can be represented by the following general formula:

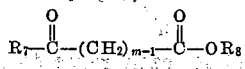

wherein R7 represents an alkyl group (especially methyl and ethyl groups), R8 represents an alkyl group (especially methyl, ethyl, isopropyl, n-propyl, n-butyl, isobutyl and secondary butyl groups) and $m$ represents a positive integer of from 1 to 3.

Typical of the aldehydes, ketones, diketones and keto carboxylic esters are: formaldehyde, acetaldehyde, propionaldehyde, n-butyraldehyde, isobutyraldehyde, phenylacetaldehyde, benzaldehyde, p-methylbenzaldehyde, crotonaldehyde, furfuraldehyde, acetone, ethyl methyl ketone, methyl n-propyl ketone, methyl isopropyl ketone, methyl n-butyl ketone, methyl isobutyl ketone, diethyl ketone, methyl isopropenyl ketone, acetophenone, methyl benzyl ketone, p-methylacetophenone, diacetyl, dipropionyl, di-n-butyryl, diisobutyryl, acetyl acetone, hexanedione-2,4, methyl pyruvate, ethyl pyruvate, methyl acetoacetate, ethyl acetoacetate, n-propyl acetoacetate, n-butyl acetoacetate, methyl levulinate, etc.

As metal salts of difluorophosphoric acid, I can advantageously use those represented by the following general formula:

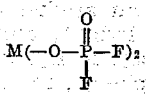

wherein M represents a divalent metal selected from the group consisting of zinc, cobalt, lead, ferrous iron and sodium. These metal salts can conveniently be prepared by reacting the appropriate metal oxide with difluorophosphoric acid in the presence of a lower aliphatic alcohol, e. g. methanol, ethanol, etc. The amount of catalyst can be varied depending on the type and reactivity of the carbonyl-containing compound used. Generally concentrations of catalyst from 0.01 to 2.0 per cent by weight, based on the weight of the carbonyl-containing compound, can be employed. Concentrations varying from 0.1 to 0.5 per cent by weight, based on the weight of the carbonyl-containing compound, have been found to be especially useful for the purposes of my invention.

Larger or smaller concentrations can, of course, be utilized, although there is ordinarily no advantage in doing so.

Where the carbonyl compound employed is an aldehyde, it is advantageous ordinarily to add the ketene and the aldehyde simultaneously and in equimolecular proportions to the catalyst or to a medium containing the catalyst. Where the carbonyl compound employed is a ketone, diketone or a keto carboxylic ester, the ketene is ordinarily advantageously added to the ketone or keto carboxylic ester containing the catalyst.

Advantageously my new process is carried out in a solvent for the reactants, i. e. an organic liquid which dissolves both the ketene and the aldehyde, ketone, diketone or keto carboxylic ester, and which is relatively inert to the reactants. Suitable solvents include the dialkyl ethers which are liquid at 10° C., e. g. diethyl ether, ethyl isopropyl ether, diisopropyl ether, ethyl n-butyl ether, methyl n-propyl ether, etc., cyclic ethers which are liquid at 10° C., e. g. 1,4-dioxane, chlorinated hydrocarbons which are liquid at 10° C., e. g. chloroform, carbon tetrachloride, ethylidene dichloride, ethylene dichloride, etc., hydrocarbons which are liquid at 10° C., e. g. benzene toluene, etc.

In the case of the lower aldehydes, such as formaldehyde and acetaldehyde, ketones which are liquid at 10° C. can be employed as solvents because formaldehyde and acetaldehyde react with the ketenes much faster than do the ketones to give β-lactones in accordance with my process. Acetone and methyl ethyl ketone are advantageously employed as solvents when formaldehyde or acetaldehyde is employed.

The β-lactones themselves are excellent solvents in which to carry out my new process and are the preferred solvents.

The temperature may likewise be varied according to the type of reactants being employed. The temperature may be as low as −50° C. or as high as +50° C. Generally I prefer to use temperatures between 0° and 20° C.

The process of my invention can be carried out batchwise or continuously (e. g. in the continuous manner described in the copending application of Hugh J. Hagemeyer, Jr., and Delmar C. Cooper, Serial No. 660,286, filed on April 6, 1946 now Patent No. 2,469,690 issued May 10, 1949.) Where ketene (CH2=C=O) is prepared by the catalytic pyrolysis of acetic acid at reduced pressures, it is advantageous to carry out the process at reduced pressure in a scrubber-type reactor, e. g. ketene and formaldehyde can be reacted at reduced pressure in a scrubber-type reactor (in the manner described in the copending application of Herbert G. Stone, Serial No. 660,285, filed on April 6, 1946, now Patent No. 2,469,704 issued May 10, 1949, which uses β-propionolactone as a solvent and boric acid as a catalyst).

Many of the β-lactones can be distilled from the reaction mixtures under reduced pressures. However, many of the β-lactones derived from aldehydes and ketones containing olefinic bonds (e. g. crotonaldehyde, methyl isopropenyl ketone, furfuraldehyde, etc.) and many of the β-lactones derived from keto carboxylic esters and diketones cannot be distilled even under reduced pressure, without undergoing decarboxylation, i. e. loss of carbon dioxide, to give unsaturated compounds. Even the lower molecular weight β-lactones derived from lower molecular weight aldehydes and ketones, e. g. formaldehyde, acetaldehyde, acetone and ethyl methyl ketone, have a tendency to polymerize and/or decarboxylate when heated. With these lower molecular weight β-lactones, it is advantageous to flash distill (i. e. distill rapidly under a low vacuum, the pump producing the vacuum having a capacity greater than the volume of vapor in the still) the reaction mixture and then to purify further the β-lactone by fractional redistillation under reduced pressure.

If desired, the β-lactone need not be separated from the reaction mixture directly, but may be hydrolyzed to the hydroxy carboxylic acid which may subsequently be dehydrated to the unsaturated carboxylic acid according to the following equations:

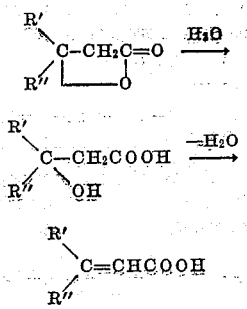

wherein R' and R'' each represents hydrogen or a hydrocarbon radical.

Alternatively, as a measure of the β-lactone produced, the reaction mixture may be distilled at atmospheric pressure thus causing the decarboxylation of the lactone to an unsaturated compound. This manner of procedure is particularly valuable when it is desired to prepare an unsaturated ketone from the lactone formed by reacting a ketene with a diketone or an unsaturated ester from the lactone formed by reacting a ketene with a ketoester.

The following examples will serve to illustrate further the manner of practicing my invention.

*Example I.—Lactone of β-hydroxypropionic acid (β-propionolactone)*

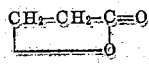

Gaseous ketene was prepared by the pyrolysis of acetone with an electrically heated, Nichrome coil. The vapors evolved from the pyrolysis tube were cooled, and any unreacted acetone condensed.

Gaseous formaldehyde was prepared by heating paraformaldehyde to a temperature of about 140°–160° C.

The gaseous ketene and gaseous formaldehyde were then mixed in substantially equimolar quantities and passed into a stirred solution of 0.2 g. of zinc difluorophosphate in 70 cc. of diethyl ether maintained at a temperature of from 0°–10° C. The heat evolved due to the exothermic nature of the reaction was removed by cooling the reaction vessel by immersion in an ice bath. The ketene and formaldehyde (both in gaseous form) were continuously passed into the catalyst solution until 1.0 gram-mol of each reactant had been added. The catalyst was destroyed by adding 0.5 g. of sodium carbonate, dissolved in 2 cc. of water, to the reaction mixture. The supernatant liquid was separated from the precipitate which formed upon addition of the sodium carbonate solution. After removal of the low boiling diethyl ether, an 80 per cent yield of β-propionolactone boiling at 37°–40° C./4 mm. was obtained upon distillation of the residual liquid.

The zinc difluorophosphate used in the above example was obtained as follows:

4.1 g. of zinc oxide were suspended in 30 cc. of methanol, and 10.2 g. of difluorophosphoric acid were slowly added with stirring. The solution was then evaporated on a steam bath. The salt remaining after the evaporation was complete was soluble in acetone. By substituting molecularly equivalent amounts of the oxides of cobalt, lead, ferrous iron and cadmium for the zinc oxide, the corresponding salts of difluorophosphoric acid can be prepared.

*Example II.—Lactone of β-hydroxy-β-methylbutyric acid (β-methyl-β-butyrolactone)*

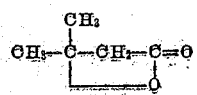

0.2 g. of the zinc salt of difluorophosphoric acid were dissolved in 250 cc. of acetone, and ketene was passed through the solution with constant stirring while the temperature was maintained at 20°–25° C. After 1 gram-mol of ketene had been reacted, the reaction mixture was flash distilled at 80° C. and 2 mm. pressure. On redistillation of the crude distillate, β-methyl-β-butyrolactone boiling at 55° C./10 mm. was obtained. The lactone was then converted to an acid as follows:

The pure lactone was dissolved in 30 cc. of water and 30 cc. of hydrochloric acid. The solution was then distilled through a column, and after most of the water had been removed, crystals of β,β-dimethylacrylic acid began to form in the condenser. The acid was collected by extracting the aqueous distillate with diethyl ether. The yield of acid, after evaporating off the ether, amounted to 70 per cent, based on the amount of ketene consumed. After recrystallization from water, the β,β-dimethylacrylic acid was titrated with a standard alkali solution. The equivalent weight was found to be 100 on analysis, while the calculated equivalent weight was 100.

When a molecularly equivalent amount of acetaldehyde and ferrous difluorophosphate replace the acetone and zinc difluorophosphate, respectively, in the above example, the lactone of β-hydroxybutyric acid represented by the following formula:

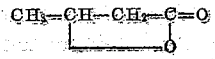

and having a boiling point of 54° C. at 10 mm. of mercury can be obtained.

*Example III.—Lactone of β-carbethoxymethyl-β-hydroxybutyric acid*

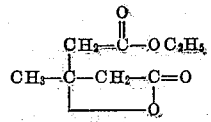

0.26 g. of cadmium difluorophosphate (prepared according to the method described in Example I) were dissolved in 260 g. of ethyl acetoacetate, and the solution was cooled to 15°–20° C. Gaseous ketene was then passed in until a total of 84 g. had been added. The reaction mixture consisted essentially of the lactone of β-carbethoxymethyl-β-hydroxybutyric acid represented by the above formula. The lactone was decarboxylated by refluxing the reaction mixture at atmospheric pressure, the temperature of decomposition being about 90°–110° C. On fractionally distilling the residue, ethyl isopropenylacetate (ethyl 3-methyl-3-butenoate) was obtained as a distillate boiling at 54.5° C./20 mm. and having a refractive index of 1.4400. On reduction of this ester with Raney nickel at 80° C. under 1000 p. s., ethyl isovalerate was obtained. The yield of the lactone represented by the above formula was 50 per cent based on the ethyl isovalerate formed.

*Example IV.—Lactone of β-acetyl-β-hydroxybutyric acid*

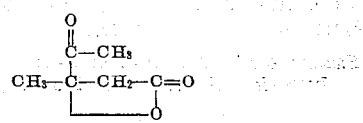

Gaseous ketene was passed into 86 g. of diacetyl, having dispersed therein 0.09 g. of cobalt difluorophosphate (obtained as described in Example I), until a total of 42 g. had been added. The temperature was maintained at 15°–20° C. during the addition. The reaction mixture consisted essentially of the lactone represented by the above formula. It was then decarboxylated by heating at 90°–110° C. at atmospheric pressure. When carbon dioxide gas was not involved, the residue was fractionally distilled to give isopropenyl methyl ketone boiling at 95°–98° C/735 mm., in addition to a small amount of 2,3-dimethyl-1,3-butadiene boiling at 68° C./735 mm.

Other β-lactones can likewise be prepared according to the process of my invention. For example, by replacing the formaldehyde of Example I by a molecularly equivalent amount of n-butyraldehyde, β-caprolactone represented by the following formula:

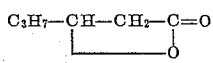

can be obtained. In like manner, when dimethylketene replaces the ketene of Example I in a molecularly equivalent amount, a lactone represented by the following formula:

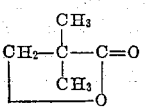

can be obtained. When 1 mol. of ketene is reacted with 1 mol. of acetophenone in the presence of lead difluorophosphate, a lactone represented by the following formula:

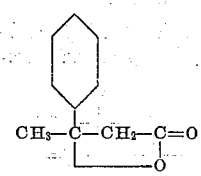

can be obtained. When a molecularly equivalent amount of propionyl acetone (hexane-2,4-dione) replaces the diacetyl of Example IV, a lactone represented by the following formula:

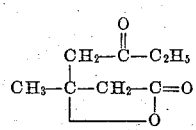

can be obtained. When 1 mol. of diphenylketene is reacted with 1 mol. of acetaldehyde in the presence of 0.1 per cent ferrous difluorophosphate, a lactone represented by the formula:

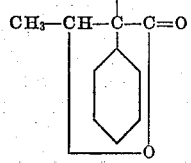

can be obtained. Heterocyclic and unsaturated carbonyl-containing compounds can also be used to prepare β-lactones according to the above-described process. Furfural, for example, produces the lactone represented by the following formula:

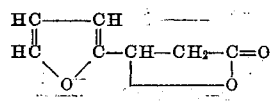

when reacted with ketene in the presence of lead difluorophosphate, while crotonaldehyde gives the lactone represented by the following formula:

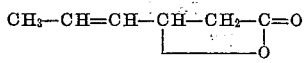

The lactones produced according to the process of my invention are useful in the preparation of synthetic resins, polymers and rubbers. They are also valuable intermediates in the preparation of unsaturated acids, esters, amides, and nitriles.

What I claim as my invention and desire secured by Letters Patent of the United States is:

1. A process for making beta-lactones which comprises reacting at a temperature of from —50° C. to +50° C. a ketene having the formula:

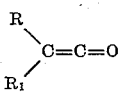

wherein R and $R_1$ each represents a member selected from the group consisting of a hydrogen atom, a methyl group, an ethyl group and a phenyl ($C_6H_5$—) group with a carbonyl-containing compound selected from the group consisting of aldehydes having the formula:

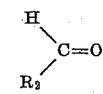

wherein $R_2$ represents a member selected from the group consisting of a hydrogen atom, an alkyl group having the formula $C_nH_{2n+1}$ wherein $n$ is a positive integer from 1 to 4, a benzyl group, a beta-phenyl ethyl group, and a phenyl ($C_6H_5$—) group, ketones having the formula:

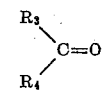

wherein $R_3$ and $R_4$ each represents a member selected from the group consisting of alkyl groups having the formula $C_nH_{2n+1}$ wherein $n$ is a positive integer from 1 to 4, a benzyl group, a beta-phenyl ethyl group and a phenyl ($C_6H_5$—) group, diketones having the formula:

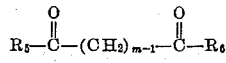

and ketoesters having the formula:

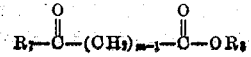

wherein $R_5$, $R_6$, $R_7$ and $R_8$ each represents an alkyl group having the formula $C_nH_{2n+1}$ wherein $n$ is a positive integer from 1 to 4, and $m$ represents a positive integer from 1 to 3, in the presence of from 0.01–2.0 per cent by weight, based on the weight of the carbonyl-containing compound, of a catalyst selected from those represented by the following general formula:

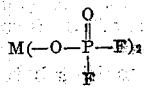

wherein M represents a member selected from the group consisting of zinc, cobalt, ferrous iron, lead and cadmium.

2. A process for making a beta-lactone which comprises reacting at a temperature of from $-50°$ C. to $+50°$ C. ketene ($CH_2=C=O$) with a carbonyl compound selected from the group consisting of aldehydes having the formula:

wherein $R_2$ represents a member selected from the group consisting of a hydrogen atom, an alkyl group having the formula $C_nH_{2n+1}$ wherein $n$ is a positive integer from 1 to 4, a benzyl group, a beta-phenyl ethyl group, and a phenyl ($C_6H_5-$) group, ketones having the formula:

wherein $R_3$ and $R_4$ each represents a member selected from the group consisting of alkyl groups having the formula $C_nH_{2n+1}$ wherein $n$ is a positive integer from 1 to 4, a benzyl group, a beta-phenyl ethyl group and a phenyl ($C_6H_5-$) group, diketones having the formula:

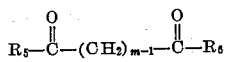

and ketoesters having the formula:

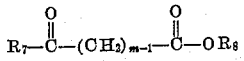

wherein $R_5$, $R_6$, $R_7$ and $R_8$ each represents an alkyl group having the formula $C_nH_{2n+1}$ wherein $n$ is a positive integer from 1 to 4, and $m$ represents a positive integer from 1 to 3, in the presence of from 0.01–2.0 per cent by weight, based on the weight of the carbonyl-containing compound, of a catalyst selected from those represented by the following general formula:

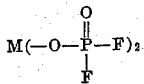

wherein M represents a member selected from the group consisting of zinc, cobalt, ferrous iron, lead and cadmium.

3. A process for making a beta-lactone which comprises reacting at a temperature of from $-50°$ C. to $+50°$ C. ketene ($CH_2=C=O$) with an aldehyde represented by the formula:

wherein $R_2$ represents a member selected from the group consisting of a hydrogen atom, an alkyl group having the formula $C_nH_{2n+1}$ wherein $n$ is a positive integer from 1 to 4, a benzyl group, a beta-phenyl ethyl group, and a phenyl ($C_6H_5-$) group in the presence of from 0.01–2.0 per cent by weight, based on the weight of the carbonyl-containing compound, of a catalyst selected from those represented by the following general formula:

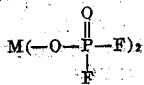

wherein M represents a member selected from the group consisting of zinc, cobalt, ferrous iron, lead and cadmium.

4. A process for making a beta-lactone which comprises reacting at a temperature of from $-50°$ C. to $+50°$ C. ketene ($CH_2=C=O$) with an aldehyde represented by the formula:

wherein $R_2$ represents a member selected from the group consisting of a hydrogen atom, an alkyl group having the formula $C_nH_{2n+1}$ wherein $n$ is a positive integer from 1 to 4, a benzyl group, a beta-phenyl ethyl group, and a phenyl ($C_6H_5-$) group in the presence of from 0.01–2 per cent by weight, based on the weight of the carbonyl-containing compound, of zinc difluorophosphate.

5. A process for making a beta-lactone which comprises reacting at a temperature of from $-50°$ C. to $+50°$ C. ketene ($CH_2=C=O$) with an aldehyde represented by the formula:

wherein $R_2$ represents a member selected from the group consisting of a hydrogen atom, an alkyl group having the formula $C_nH_{2n+1}$ wherein $n$ is a positive integer from 1 to 4, a benzyl group, a beta-phenyl ethyl group, and a phenyl ($C_6H_5-$) group in the presence of from 0.01–2 per cent by weight, based on the weight of the carbonyl-containing compound, of cobalt difluorophosphate.

6. A process for making a beta-lactone which comprises reacting at a temperature of from $-50°$ C. to $+50°$ C. ketene ($CH_2=C=O$) with an aldehyde represented by the formula:

wherein $R_2$ represents a member selected from the group consisting of a hydrogen atom, an alkyl group having the formula $C_nH_{2n+1}$ wherein $n$ is a positive integer from 1 to 4, a benzyl group, a beta-phenyl ethyl group, and a phenyl ($C_5H_6-$) group in the presence of from 0.01–2 per cent by weight, based on the weight of the carbonyl-containing compound of cadmium difluorophosphate.

7. A process for making beta-propionolactone comprising reacting ketene with formaldehyde at a temperature of from $-50°$ to $+50°$ C. in the presence of from 0.01–2.0 percent by weight, based on the weight of the formaldehyde, of a catalyst selected from those represented by the following general formula:

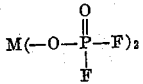

wherein M represents a member selected from the group consisting of zinc, cobalt, ferrous iron, lead and cadmium.

8. A process for making beta-propionolactone comprising reacting ketene with formaldehyde at a temperature of from —50° to +50° C. in the presence of from 0.01–2.0 percent by weight, based on the weight of the formaldehyde, of a catalyst selected from those represented by the following general formula:

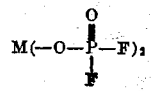

wherein M represents a member selected from the group consisting of zinc, cobalt, ferrous iron, lead and cadmium, said catalyst being dispersed in a medium consisting of beta-propionolactone.

9. A process for making beta-propionolactone comprising reacting ketene with formaldehyde at a temperature of from —50° to +50° C. in the presence of from 0.01–2.0 percent by weight, based on the weight of the formaldehyde, of zinc difluorophosphate.

10. A process for making beta-propionolactone comprising reacting ketene with formaldehyde at a temperature of from —50° to +50° C. in the presence of from 0.01–2.0 percent by weight, based on the weight of the formaldehyde, of cobalt difluorophosphate.

11. A process for making beta-propionolactone comprising reacting ketene with formaldehyde at a temperature of from —50° to +50° C. in the presence of from 0.01–2.0 percent by weight, based on the weight of the formaldehyde, of cadmium difluorophosphate.

JOHN R. CALDWELL.

No references cited.